United States Patent
Sirotkin et al.

(10) Patent No.: US 9,432,093 B2
(45) Date of Patent: Aug. 30, 2016

(54) DYNAMIC POINT SELECTION VIA A COORDINATING SET OF BASE STATIONS

(71) Applicant: Intel Corporation, Santa Clara, CA (US)

(72) Inventors: Alexander Sirotkin, Petach (IS); Alexei Davydov, Nizhny Novgorod (RU)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 14/642,235

(22) Filed: Mar. 9, 2015

(65) Prior Publication Data

US 2015/0180555 A1 Jun. 25, 2015

Related U.S. Application Data

(63) Continuation of application No. 13/538,070, filed on Jun. 29, 2012, now Pat. No. 9,008,018.

(60) Provisional application No. 61/556,109, filed on Nov. 4, 2011, provisional application No. 61/589,774, filed on Jan. 23, 2012.

(51) Int. Cl.
*H04W 80/04* (2009.01)
*H04W 88/06* (2009.01)
(Continued)

(52) U.S. Cl.
CPC .............. *H04B 7/024* (2013.01); *H04B 7/063* (2013.01); *H04B 7/0626* (2013.01); *H04B 7/0639* (2013.01); *H04L 1/0026* (2013.01); *H04L 1/1812* (2013.01); *H04L 69/324* (2013.01); *H04W 72/0426* (2013.01); *H04W 72/1205* (2013.01)

(58) Field of Classification Search
CPC ... H04W 80/04; H04W 88/06; H04W 28/04; H04W 72/04; H04L 47/10; H04L 12/5695; H04L 47/22; H04L 47/2441; H04L 47/215
USPC .................. 370/230–231, 235, 236, 328, 329
See application file for complete search history.

(56) References Cited

U.S. PATENT DOCUMENTS

2011/0170516 A1* 7/2011 Hu .................... H04W 36/0033 370/331
2011/0249611 A1* 10/2011 Khandekar ............ H04B 7/155 370/315

(Continued)

OTHER PUBLICATIONS

Extended European Search Report received for European Patent Application No. 12846166.2, mailed Jun. 23, 2015, 5 pages.

*Primary Examiner* — Ronald B Abelson

(57) ABSTRACT

Examples are disclosed for coordinating transmission of one or more protocol data units to a wireless device from a coordinating set of base stations. In some examples, coordinating may include exchanging information via a backhaul communication channel coupling or interconnecting the base stations included in the coordinating set of base stations. For these examples, one or more protocol data units may be transmitted to the wireless device from the coordinating set of base stations via a plurality of separate communication links based on the exchanged information. Other examples are described and claimed.

24 Claims, 10 Drawing Sheets

(51) Int. Cl.
*H04W 28/04* (2009.01)
*H04W 72/04* (2009.01)
*H04L 12/801* (2013.01)
*H04L 12/54* (2013.01)
*H04L 12/815* (2013.01)
*H04L 12/819* (2013.01)
*H04B 7/02* (2006.01)
*H04B 7/06* (2006.01)
*H04L 1/00* (2006.01)
*H04L 1/18* (2006.01)
*H04L 29/08* (2006.01)
*H04W 72/12* (2009.01)

(56) References Cited

U.S. PATENT DOCUMENTS

2011/0299452 A1* 12/2011 Seo .................. H04B 7/2606
370/315
2012/0287799 A1* 11/2012 Chen .................. H04B 7/024
370/252
2013/0143574 A1 6/2013 Teyeb et al.
2013/0258890 A1* 10/2013 Li .................... H04W 24/02
370/252

* cited by examiner

Configuration Table 400

| Uplink-Downlink Configuration | Downlink-to-Uplink Switch-Point Periodicity | Subframe Index/Number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Downlink Transmission Message 500

| Scheduling Info | PMI | Subframe Index/ Number | Tx Start Time | HARQ Info. |
|---|---|---|---|---|
| 510 | 520 | 530 | 540 | 550 |

Storage Medium 1000

Computer Executable
Instructions for 800

Computer Executable
Instructions for 900

*FIG. 10*

DYNAMIC POINT SELECTION VIA A COORDINATING SET OF BASE STATIONS

RELATED CASE

This application is a continuation of, claims the benefit of and priority to previously filed U.S. patent application Ser. No. 13/538,070 entitled "Dynamic Point Selection via a Coordinating Set of Base Stations" filed Jun. 29, 2012, which claims priority to U.S. Provisional Patent Application No. 61/556,109, filed on Nov. 4, 2011 and U.S. Provisional Patent Application No. 61/589,774, filed on Jan. 23, 2012, the entirety of the above applications are hereby incorporated by reference.

BACKGROUND

Coordinated Multipoint (CoMP) is an example of a collaborative scheme increasingly being used in wireless networks. CoMP may be implemented to mitigate interference between base stations, improve system spectral efficiency and enhance throughput performance for user equipment (UE) located at the edge of a base station's coverage area. In some examples, base stations for a wireless network may coordinate downlink transmissions to UEs to accomplish at least one of these goals associated with improving a wireless network's performance.

BRIEF DESCRIPTION OF THE DRAWINGS

FIG. 10 illustrates an example of a storage medium.

DETAILED DESCRIPTION

Figure 1:
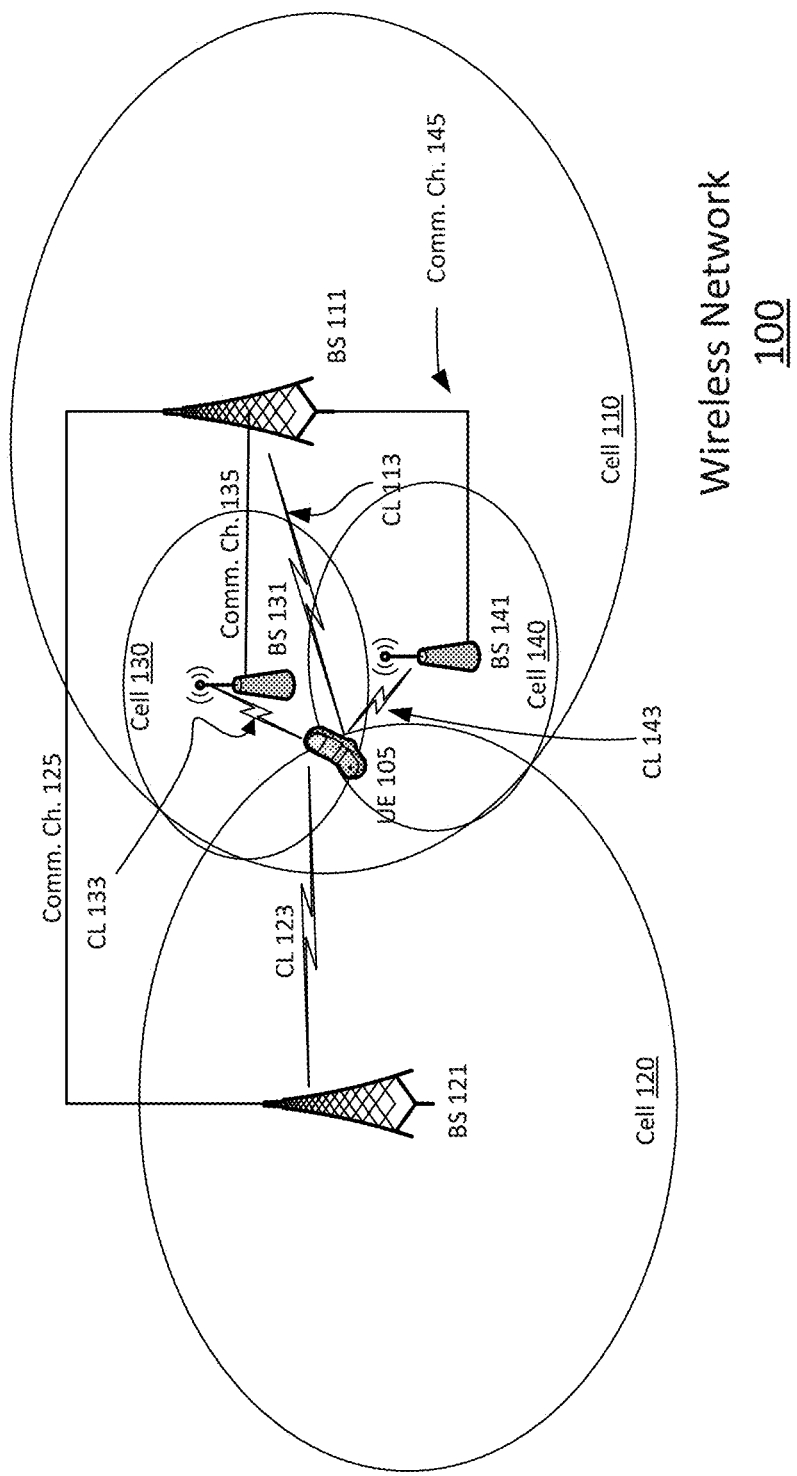
FIG. 1 illustrates an example of a first wireless network.

Examples are generally directed to improvements for wireless mobile broadband technologies. Wireless mobile broadband technologies may include any wireless technologies suitable for use with wireless devices or user equipment (UE), such as one or more third generation (3G) or fourth generation (4G) wireless standards, revisions, progeny and variants. Examples of wireless mobile broadband technologies may include without limitation any of the Institute of Electrical and Electronics Engineers (IEEE) 802.16m and 802.16p standards, 3rd Generation Partnership Project (3GPP) Long Term Evolution (LTE) and LTE-Advanced (LTE ADV) standards, and International Mobile Telecommunications Advanced (IMT-ADV) standards, including their revisions, progeny and variants. Other suitable examples may include without limitation Global System for Mobile Communications (GSM)/Enhanced Data Rates for GSM Evolution (EDGE) technologies, Universal Mobile Telecommunications System (UMTS)/High Speed Packet Access (HSPA) technologies, Worldwide Interoperability for Microwave Access (WiMAX) or the WiMAX II technologies, Code Division Multiple Access (CDMA) 2000 system technologies (e.g., CDMA2000 1xRTT, CDMA2000 EV-DO, CDMA EV-DV, and so forth), High Performance Radio Metropolitan Area Network (HIPERMAN) technologies as defined by the European Telecommunications Standards Institute (ETSI) Broadband Radio Access Networks (BRAN), Wireless Broadband (WiBro) technologies, GSM with General Packet Radio Service (GPRS) system (GSM/GPRS) technologies, High Speed Downlink Packet Access (HSDPA) technologies, High Speed Orthogonal Frequency-Division Multiplexing (OFDM) Packet Access (HSOPA) technologies, High-Speed Uplink Packet Access (HSUPA) system technologies, 3GPP Rel. 8 and 9 of LTE/System Architecture Evolution (SAE), and so forth. The examples are not limited in this context.

By way of example and not limitation, various examples may be described with specific reference to various 3GPP LTE and LTE ADV standards, such as the 3GPP LTE Evolved UMTS Terrestrial Radio Access Network (E-UTRAN), Universal Terrestrial Radio Access (E-UTRA) and LTE ADV Radio Technology 36 Series of Technical Specifications (collectively "3GPP LTE Specifications"), and IEEE 802.16 standards, such as the IEEE 802.16-2009 standard and current third revision to IEEE 802.16 referred to as "802.16Rev3" consolidating standards 802.16-2009, 802.16h-2010 and 802.16m-2011, and the IEEE 802.16p draft standards including IEEE P802.16.1b/D2 Jan. 2012 titled "Draft Amendment to IEEE Standard for Wireless-MAN-Advanced Air Interface for Broadband Wireless Access Systems, Enhancements to Support Machine-to-Machine Applications" (collectively "IEEE 802.16 Standards"), and any drafts, revisions or variants of the 3GPP LTE Specifications and the IEEE 802.16 Standards. Although some embodiments may be described as a 3GPP LTE Specifications or IEEE 802.16 Standards system by way of example and not limitation, it may be appreciated that other types of communications system may be implemented as various other types of mobile broadband communications systems and standards. The examples are not limited in this context As contemplated in the present disclosure, coordinated multipoint (CoMP) may be implemented for a wireless network to possibly mitigate interference between base stations, improve system spectral efficiency and enhance throughput performance for user equipment (UE) located at the edge of a base station's coverage area. Some CoMP schemes assume use of remote radio heads or entities (RRH) that have a fast, proprietary interface between the RRH and a base station such as an evolved Node B (eNB) base station for a Wireless LTE or LTE-A network. These CoMP schemes further assumed that a single eNB serves multiple cells through the deployment of RRHs that together implement what is effectively an intra-eNB CoMP scheme.

A fast proprietary interface between RRHs and an eNB may allow an intra-eNB CoMP scheme to meet latency and throughput requirements for an effective CoMP scheme. However, since a proprietary interface is not standardized, operators may be forced to use equipment from the same vender. Another disadvantage of an intra-eNB CoMP scheme may be that this type of CoMP scheme may be limited to implementations in areas covered by RRHs connected to the same eNB. Adjacent cells served by different eNBs (possibly from different venders) may not be able to fully utilize the benefits of a CoMP scheme. As a result, the adjacent cells having UEs located at the edge of a given eNB's coverage area may not be able to implement a CoMP scheme that mitigates interference, improves system spectral efficiency and enhances throughput performance.

In some examples, techniques are implemented for receiving, at a base station for a wireless network (e.g., an eNB), measurement information from a wireless device that indicates an ability of the wireless device to receive data from a coordinating set of base stations via a plurality of separate communication links. Transmission of one or more protocol data units (PDUs) to the wireless device from the coordinating set of base stations may then be coordinated. The coordinating may include exchanging information via one or more backhaul communication channels coupling base stations included in the coordinating set of base stations. In some examples, one or more protocol data units may then be caused to be transmitted to the wireless device from the coordinating set of base stations via the plurality of separate communication links based on the exchanged information.

FIG. 1 illustrates an example of a wireless network 100. In some examples, as shown in FIG. 1, wireless network 100 includes cells 110 and 120. Also, as shown in FIG. 1, cells 110 and 120 may each include a base station (BS) 111 and a BS 121, respectively. According to some examples, cells 110 and 120 may represent macro cells for wireless network 100. For these examples, cell 110 may also include cells 130 and 140 that separately include a BS.131 and a BS 141, respectively. Cells 130 and 140, in some examples, may represent micro or pico cells included within macro cell 110. As shown in FIG. 1, BS 111 may be coupled or interconnected with BSs 121, 131 and 141 via a backhaul communication channels. These backhaul communication channels are shown in FIG. 1 as communication channel (Comm. Ch.) 125, a Comm. Ch. 135 and a Comm. Ch. 145.

According to some examples, as shown in FIG. 1, user equipment (UE) 105 may be located at or near the edge of cells 110, 120, 130 and 140. Also, as shown in FIG. 1, UE 105 may be communicatively coupled to and/or may be able to measure communication signals from BSs 111, 121, 131 and 141 via a communication link (CL) 113, a CL 123, a CL 133 and a CL143, respectively.

In some examples, BS 111 may include logic and/or features arranged to establish a communication link with UE 105. The logic and/or features may also be arranged to associate UE 105 with a coordinating set of base stations. For these examples, the coordinating base stations may include BSs 111, 121, 131 or 141. The logic and/or features included in BS 111 may also be arranged to coordinate transmission of one or more PDUs to UE 105. The coordination may include exchanging information via one or more of Comm. Chs. 125, 135 or 145 that couple BS 111 with BSs 121, 131 or 141, respectively. Also, for these examples, the logic and/or features included in BS 111 may be arranged to cause the one or more PDUs to be transmitted to UE 105 from the coordinating set of base stations via one or more of CLs 113, 123, 133 or 143 coupled between UE 105 and BSs 111, 121, 131 or 141. The transmission of the PDUs may be caused based on the information exchanged via one or more of Comm. Chs. 125, 135 or 145.

In some examples, coordinating transmission of the one or more PDUs may be to balance transmission load of the one or more PDUs between the various base stations coupled to UE 105 and included in the coordinating set of base stations. For example, the coordination may allow for a type of CoMP scheme called dynamic point selection (DPS). Using a DPS CoMP scheme, BSs 111, 121, 131 or 141 may load balance PDUs to be transmitted to UE 105 via each base station's respective communication link with UE 105. Use of the DPS CoMP scheme for transmission of the one or more PDUs may also mitigate possible downlink interference between the base stations. For example, downlink transmissions may be scheduled to minimize or reduce interference between the base stations. Also, when transmitting to other UEs besides UE 105, BSs 111, 121, 131 or 141 may implement resource blanking schemes that include the scheduling of one or more almost blank subframes (ABS), scheduling reduced power subframes or scheduling a set of blanked physical resource blocks to minimize or reduce interference.

According to some examples, UE 105 may be any electronic device having wireless capabilities or equipment. For some examples, UE 105 may be implemented in a fixed device. A fixed device generally refers to an electronic device designed to be in a fixed, stationary, permanent or otherwise non-moving position or location that does not vary over time. For instance, a fixed device may be installed with fixtures, attachments and housings to prohibit movement, including wired power lines, transmission lines, and so forth. By way of contrast, a mobile device is designed to be portable enough to be frequently moved between various locations over time. It may be appreciated that although a fixed device is generally stationary, some fixed devices may be disconnected from their current equipment in a first fixed location, moved to a second fixed location, and connected to equipment at the second fixed location.

According to some examples, the logic and/or features at BSs 111, 121 131 or 141 may include system equipment, such as network equipment for a communications system or network compliant with one or more 3GPP LTE Specifications (e.g., LTE-A). For example, these base stations may be implemented as evolved Node B (eNB) base stations for a Wireless LTE or LTE-A network. Although some examples are described with reference to a base station or eNB, embodiments may utilize any network equipment for a wireless network. The examples are not limited in this context.

In some examples, Comm. Chs. 125, 135 or 145 may be arranged or configured as backhaul communication channels separately including one or more communication links via which BS 111 may exchange information with, BSs 121, 131 or 141. These one or more communication links may include various types of wired, wireless or optical communication mediums. For these examples, the communication links may be operated in accordance with one or more applicable communication or networking standards in any version. One such communication or networking standard may include 3GPP LTE-A and Comm. Chs. 125, 135 or 145 may be separately arranged to serve as X2 communication channels. According to some examples, logic and/or features at BS 111, 121, 131 or 141 may include an X2 interface that at least allows for BS 111 to exchange information via the X2 communication channel with these base stations.

Figure 2:
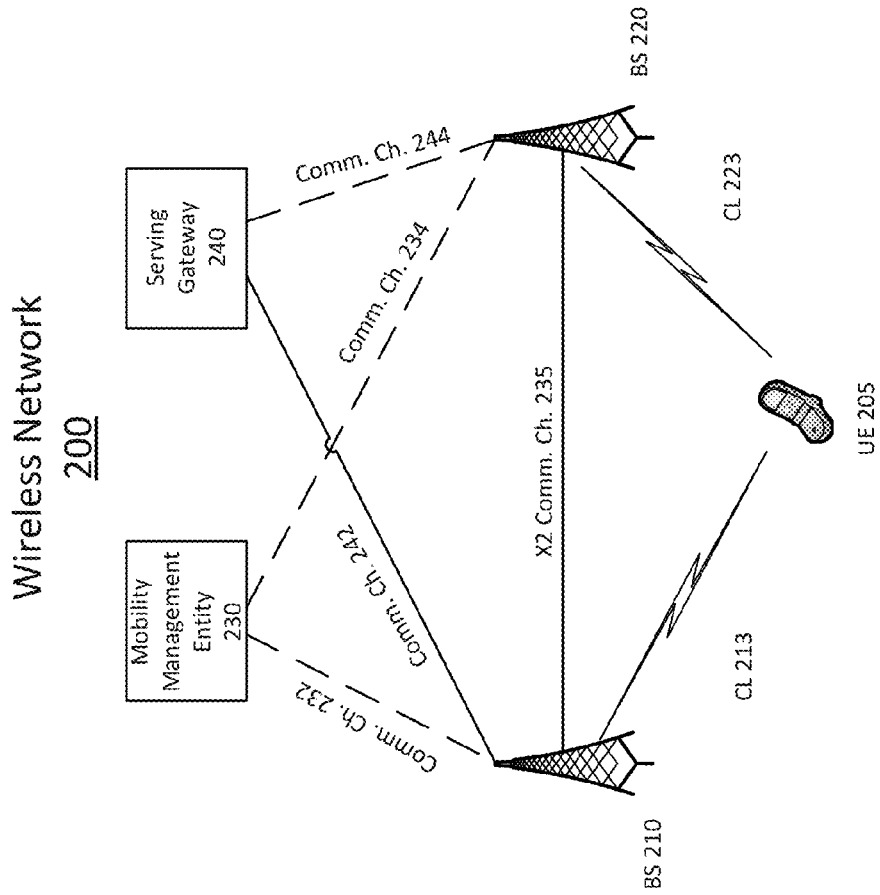
FIG. 2 illustrates an example of a second wireless network.

FIG. 2 illustrates an example of a wireless network 200. According to some examples, wireless network 200 may be configured to operate in compliance with one or more 3GPP LTE standards such as LTE-A. As shown in FIG. 2, wireless network 200 includes a BS 210 and a BS 220 coupled via an X2 Comm. Ch. 235. BS 210 and BS 220 are also shown as separately coupling to an UE 205 via a CL 213 and a CL 223, respectively. Wireless network 200 is also shown in FIG. 2 to include a mobility management entity 230 and a serving gateway 240. In some examples, as shown in FIG. 2, mobility management entity 230 couples to BS 210 and BS 220 via Comm. Chs. 232 and 234, respectively. Also as shown in FIG. 2, serving gateway 240 couples to BS 210 and BS 220 via Comm. Chs. 242 and 244, respectively.

According to some examples, the solid line for Comm. Ch. 242 between serving gateway 240 and BS 210 indicates a route for one or more PDUs destined for UE 205. For these examples, the one or more PDUs may have been routed through a core network associated with wireless network 200. The one or more PDUs may convey packetized information or data to include voice, video, audio or data files to UE 205.

In some examples, since BS 210 receives the one or more PDUs from serving gateway 240, BS 210 may be deemed as a primary base station for a coordinating set of base stations. Meanwhile, BS 220 may be deemed as a secondary base station for the coordinating set of base stations. As the primary base station, BS 210 may include logic and/or features to exchange various messages with BS 220 in order to coordinate transmission of the one or more PDUs to UE 205. BS 210 may coordinate the transmission of the one or more PDUs via the exchange of information over a backhaul communication channel such as X2 Comm. Ch. 235.

In some examples, BS 210 serving as the primary base station, and BS 220 serving as the secondary base station, may constitute a coordinating set of base stations associated with UE 205. For these examples, BS 210 may establish CL 213 with UE 205. UE 205 may provide measurement information to BS 210 via CL 213 that indicates an ability by UE 205 to receive data from BS 220, e.g., via CL 223. For example, the measurement information may include channel state information (CSI) associated with CL 223's ability to provide a communication link for at least downlink transmissions from BS 220. According to some examples, the CSI associated with CL 223 may include such information as a precoding matrix indicator (PMI), a rank indicator (RI) or a channel quality indicator (CQI). The PMI may indicate the optimum precoding matrix to be used at BS 220 for a given radio condition as observed by UE 205. The RI may indicate the number of useful transmission layers when spatial multiplexing is used. The CQI may provide a qualitative measure of CL 223's ability to support various data loads or throughputs transmitted from BS 220. According to some examples, if the CSI for CL 223 indicates an acceptable ability to support downlink transmissions from BS 220, BS 210 may associate UE 205 with BS 220 and thus include BS 220 in the coordinating set of base stations.

According to some examples, BS 210 may coordinate the transmission of the one or more PDUs received from serving gateway 240 to balance transmission load of the one or more PDUs between BS 210 and BS 220. BS 210 may also coordinate the transmission of the one or more PDUs to possibly mitigate downlink transmission interference between BS 210 and BS 220. For example, since CL 223 has the ability to support downlink transmissions from BS 220, UE 205 may experience interference from BS 220 while receiving downlink transmissions from BS 210. Also, UE 205 may experience interference from BS 210 while receiving downlink transmissions from BS 220. In some examples, an interference mitigation scheme such as resource blanking for subframes associated with the one or more PDUs and/or reduced power subframes associated with the one or more PDUs may be implemented at BS 210 and/or BS 220 to reduce or minimize possible interference between the two base stations.

In some examples, coordination information to load balance and/or mitigate interference between BS 210 and BS 220 may be transferred or exchanged via X2 Comm. Ch. 235 in real time (e.g., for each downlink PDU) or semi-statically (e.g., for a plurality of downlink PDUs).

Figures 3, 4, 5:
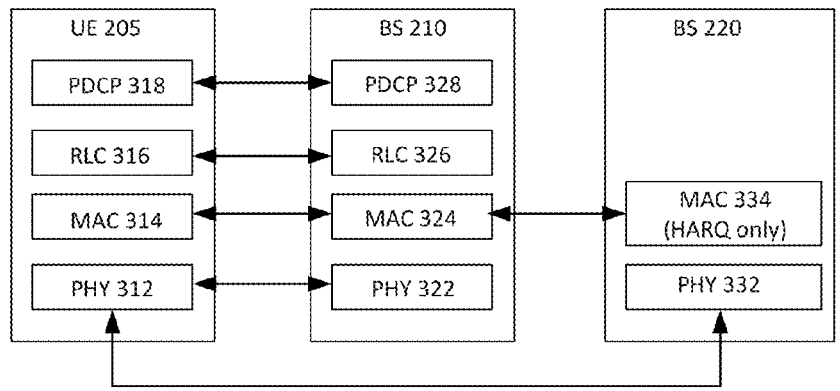
FIG. 3 illustrates example protocol stack interactions.
FIG. 4 illustrates an example of a configuration table.
FIG. 5 illustrates an example of a message format.

FIG. 3 illustrates example protocol stack interactions. In some examples, protocol stack interactions for PDUs transmitted from BS 210 to UE 205 may be as shown in FIG. 3. For these examples, BS 210 may be serving as the primary base station for a coordinating set of base stations and BS 220 may be serving as the secondary base station. As mentioned above for FIG. 2, as the primary base station, BS 210 initially receives PDUs destined for UE 205 from the core network via serving gateway 240. BS 210 may then forward one or more of these PDUs to BS 220. Both BS 210 and BS 220 may include logic and/or features to support the protocol stack interactions depicted in FIG. 3. For example, BS 210 may include logic and/or features to support several protocol stack 1 layers. These protocol stack layers are shown in FIG. 3 as a physical (PHY) 322, a media access controller (MAC) 324, a radio link control (RLC) 326 or a packet data convergence protocol (PDCP) 328. UE 205 may also include logic and/or features to support protocol stack interactions with BS 220 and/or BS 210. For examples, UE 205 is shown in FIG. 3 as including PHY 312, MAC 314, RLC 316 or PDCP 318 protocol stack layers. According to some examples, BS 220 may include logic and/or features to support at least some protocol interactions with either UE 205 or BS 210. For examples, as shown in FIG. 3, BS 220 may include logic and/or features to support protocol stack layers PHY 332 and MAC 334. In other examples (not shown), the logic and/or features of BS 220 may also support the same protocol interactions with UE 205 as shown in FIG. 3 between BS 210 and UE 205.

According to some examples, for downlink transmission of PDUs from BS 210 to UE 205, most of the data plane and user plane protocol stack layers (e.g., RLC and PDCP) may be terminated at BS 210. Also, as shown in FIG. 3, UE 205 may have some protocol stack layer interaction with BS 220 at the PHY protocol stack layer. For these examples, PHY protocol stack interactions may enable UE 205 to communicate information associated with hybrid automatic repeat request (HARQ) information to BS 220. The HARQ information may include acknowledgements (ACK) of successful receipt of one or more PDUs at UE 205 or negative acknowledgement (NACK) of unsuccessful receipt of one or more PDUs at UE 205.

In some examples, BS 220 may receive a NACK indication from UE 205 via an interaction between PHY 312 and PHY 332. The NACK may indicate that one or more PDUs transmitted from BS 210 were unsuccessfully received (e.g., received with errors). BS 220 may include logic and/or features to coordinate with BS 210 via an interaction between MAC 334 and MAC 324 for a retransmission of the one or more PDUs. Alternatively, BS 220 may receive an ACK indication from UE 205 via an interaction between PHY 312 and PHY 332. For this alternative, the ACK may indicate successful receipt of the one or more PDUs. BS 220 may then indicate to BS 210 the successful receipt via an interaction between MAC 334 and MAC 324.

FIG. 4 illustrates an example of a configuration table 400. As shown in FIG. 4, configuration table 400 includes time division duplex (TDD) information for transmission of subframes from a base station in a wireless network. In some examples, as shown in FIG. 4, configuration table 400 may include uplink-downlink configurations 0-6. For these examples, each of the uplink-downlink configurations may have downlink-to-uplink switch-point-periodicities of 5 milliseconds (ms) or 10 ms. Also, a subframe index/number from 0-9 may identify a given subframe associated with a given uplink-downlink configuration. A "D" may indicate a downlink subframe, a "U" may indicate an uplink subframe and an "S" may indicate a special subframe (e.g., reserved for control information).

According to some examples, coordinating base stations may be arranged to operate according to uplink-downlink configuration 1. As shown in FIG. 4, uplink-downlink configuration 1 may be depicted as the shaded row in configuration table 400. For these examples, the downlink-to-uplink switch-point periodicity may be 5 ms and subframe index/numbers 0, 4, 5 and 9 are used for downlink transmissions. As described more below, information exchanged between base stations included in a coordinating set may include a reference to a given subframe index/number in order to coordinate downlink transmission of one or more PDUs to a wireless device.

FIG. 5 illustrates an example of a message format 500. As shown in FIG. 5, message format 500 includes fields, 510 to 550. In some examples, one or more messages including at least a portion of the fields of downlink transmission message 500 may be exchanged between a coordinating set of base stations such as BS 210 and BS 220. These messages may be exchanged, for example, to implement a DPS CoMP scheme. The messages may be exchanged via a backhaul communication channel such as X2 Comm. Ch. 235 as shown in FIG. 2.

In some examples, the one or more messages may be in the format of downlink transmission message 500 and may include scheduling information (info.) in field 510 to be used to schedule transmission of each PDU from BS 220 to a wireless device such as UE 205. For example, scheduling info. may include similar contents as downlink control information (DCI) typically conveyed in DCI message formats (e.g., using Information Elements (IEs)) for receiving PDUs via a 3GPP LTE-A compliant communication link (e.g., CL 223). The scheduling info. may also include information to indicate a possible order of a given PDU in a sequence of PDUs that may be load balanced between BS 210 and BS 220. The scheduling info. included in field 510 may be conveyed to UE 205 via a physical downlink control channel (PDCCH) and may include information necessary for UE 205 to identify resources to receive a physical downlink shared channel (PDSCH) in a given subframe and how to decode the given subframe.

According to some examples, a precoding matrix indicator (PMI) may be included in field 520. For these examples, PMI may include beamforming information. As mentioned above, a PMI may be reported to BS 210 from UE 205 to indicate the state of the downlink channel as measured/observed by UE 205. The PMI included in field 520 may have a value associated with a codebook to indicate what beamforming is needed by BS 220 when transmitting the PDU.

In some examples, subframe index/number in field 530 may indicate via which subframe the PDU is to be transmitted to UE 205. For example, both BS 210 and BS 220 may be arranged to use uplink-downlink configuration 1 as mentioned above and depicted in configuration table 400 for FIG. 4. For configuration 1, field 530 may indicate a subframe index/number of 0, 4, 5 or 9.

According to some examples, transmit (Tx) start time included in field 540 may indicate an absolute time of a beginning of a transmission of a PDU with a granularity of at least one subframe.

In some examples, HARQ included in field 550 may indicate information associated with HARQ. For these examples, HARQ information included in field 550 may include a new data indicator (NDI) to indicate whether the downlink PDU is new data or a retransmission of previously transmitted PDU(s). HARQ information may also include of a transport block (TB) size for the PDU, a HARQ process identification (ID), or a redundancy version.

According to some examples, the information mentioned above included in fields 510 to 550 of downlink transmit message 500 may be exchanged between BS 210 and BS 220 via X2 Comm. Ch. 235. Also as mentioned above, wireless network 200 may be operated in compliance with the 3GPP LTE-A standard. In some examples, downlink transmit message 500 may be incorporated in a GPRS tunneling protocol user-plane (GTP-u) Extension Header and included with each PDU to be transmitted to UE 205. In other examples, downlink transmit message 500 may be transferred as part of an X2 message such as a COMP SCHEDULING INFO message. The COMP SCHEDULING INFO message may also include a GTP-u PDU sequence number that is used to correlate between a PDU and its corresponding scheduling information. In other examples, the information included in downlink transmit message 500 may be transferred as part of a single COMP SCHEDULING INFO message that carries scheduling information for multiple PDUs. In other examples, a PDU may be transmitted along with scheduling information in a same COMP SCHEDULING INFO message. In other examples, a different type of X2 message such as a COMP DATA TRANSFER message may carry the information described above for a message in the format of downlink transmission message 500 as well as the PDU. For each of the examples above, the message used to carry the information included in a message in the format of downlink transmission message 500 may also be formatted to carry at least the contents (e.g., a packet) of a PDU either before those contents are processed by a PDCP protocol layer (e.g., PDCP 328 of BS 220) or after those contents have been processed by the PDCP, RLC and the MAC protocol layers (e.g., PDCP 328, RLC 326 and MAC 324 of BS 220).

Figure 6:
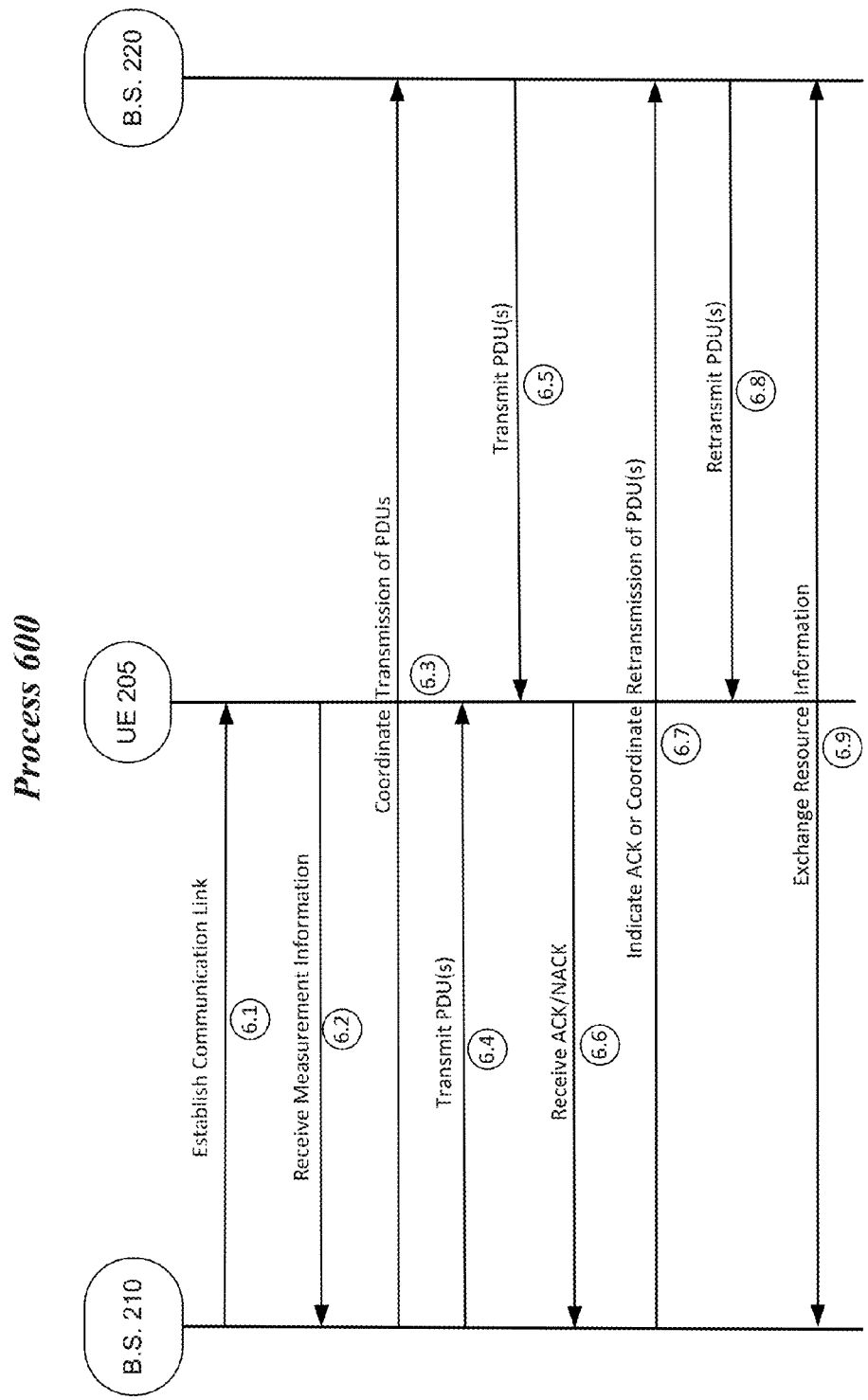
FIG. 6 illustrates an example process.

FIG. 6 illustrates an example of a process 600. In some examples, process 600 may be for implementing a CoMP scheme such as a DPS CoMP scheme. For these examples, elements of wireless network 200 as shown in FIG. 2 may be used to illustrate example operations related to process 600. The described example operations are not limited to implementations on wireless network 200 as shown in FIG. 2

Beginning at process 6.1 (Establish Communication Link), logic and/or features at BS 210 may be arranged to establish CL 213 with UE 205. In some examples, CL 213 may be established according to one or more 3GPP LTE standards to include LTE-A. For these examples, BS 210 may serve as the primary base station for a coordinating set of base stations.

Proceeding to process 6.2 (Receive Measurement Information), BS 210 may request measurement information from UE 205 to determine what other base stations may be able to transmit PDUs to UE 205. For these examples, UE 205 may provide information to indicate that downlink transmission signals from at least BS 220 (e.g., via CL 223) are adequate to receive PDUs. Based on this indication of adequacy, BS 210 may associate UE 205 with a coordinating set of base stations that includes BS 220 and also includes BS 210. BS 220 may function as a secondary base station for this coordinating set of base stations.

Proceeding to process 6.3 (Coordinate Transmission of PDUs), logic and/or features at BS 210 may be arranged to coordinate transmission of one or more PDUs. In some examples, the coordination may be part of a DPS CoMP scheme to load balance the transmission of the one or more PDUs and/or mitigate downlink transmission interference between BS 210 and BS 220 while the one or more PDUs are being transmitted. For these examples, information may be exchanged via X2 Comm. Ch. 235 and may involve the exchange of one or messages in the format of downlink transmission message 500 or at least include the information mentioned above for a message in the format of downlink transmission message 500.

Proceeding to process 6.4 (Transmit PDUs), BS 210 may include logic and/or features arranged to transmit one or more PDUs according to the information exchanged.

Proceeding to process 6.5 (Transmit PDUs), BS 220 may include logic and/or features arranged to transmit one or more PDUs according to the information exchanged.

Proceeding to process 6.6 (Receive ACK/NACK), BS 210 may include logic and/or features arrange to receive ACKs and/or NACKs from UE 205 for the one or more PDUs transmitted from either BS 210 or BS 220. In some examples, UE 205 may be arranged to transmit all ACKs and/or NACKs to the primary base station of the coordinating set of base stations.

Proceeding to process 6.7 (Indicate ACK or Coordinate Retransmission of PDU(s)), BS 210 may include logic and/or features arranged to exchange information with BS 220 to indicate whether transmitted PDUs were successfully received or were unsuccessfully received. In some examples, if at least one transmitted PDU was unsuccessfully received, a message in the format of downlink transmission message 500 may be forwarded via X2 Comm. Ch. 235 and may include HARQ information to indicate to BS 220 which PDU(s) to retransmit.

Proceeding to process 6.8 (Retransmit PDUs), BS 220 may include logic and/or features arranged to retransmit PDUs based at least on the information exchanged as mentioned above for process 6.7. In some examples, BS 220 may continue to retransmit a PDU based on exchanged information with BS 210 that indicates unsuccessful reception at UE 205. In other examples, rather than having BS 220 continually retransmit an unsuccessfully received PDU, BS 210 may retransmit these PDUs. For these other examples, BS 210 will then forward an ACK to BS 220 if BS 210's attempt to retransmit these PDUs is successfully received at UE 205. If BS 210's retransmission attempts are not successful, BS 210 may take other corrective actions.

Proceeding to process 6.9 (Exchange Resource Information), BS 210 and BS 220 may include logic and/or features to periodically exchange resource information (e.g., every 200 millisecond (ms)). In some examples, the exchanged resource information may be used to update scheduling for subsequent transmission of PDUs from the coordinating set of base stations. For these examples, either BS 210 or BS 220 may indicate a lack of adequate resources to support load balancing or may indicate more resources and a capability to handle a higher portion of the load balancing.

Figure 7:
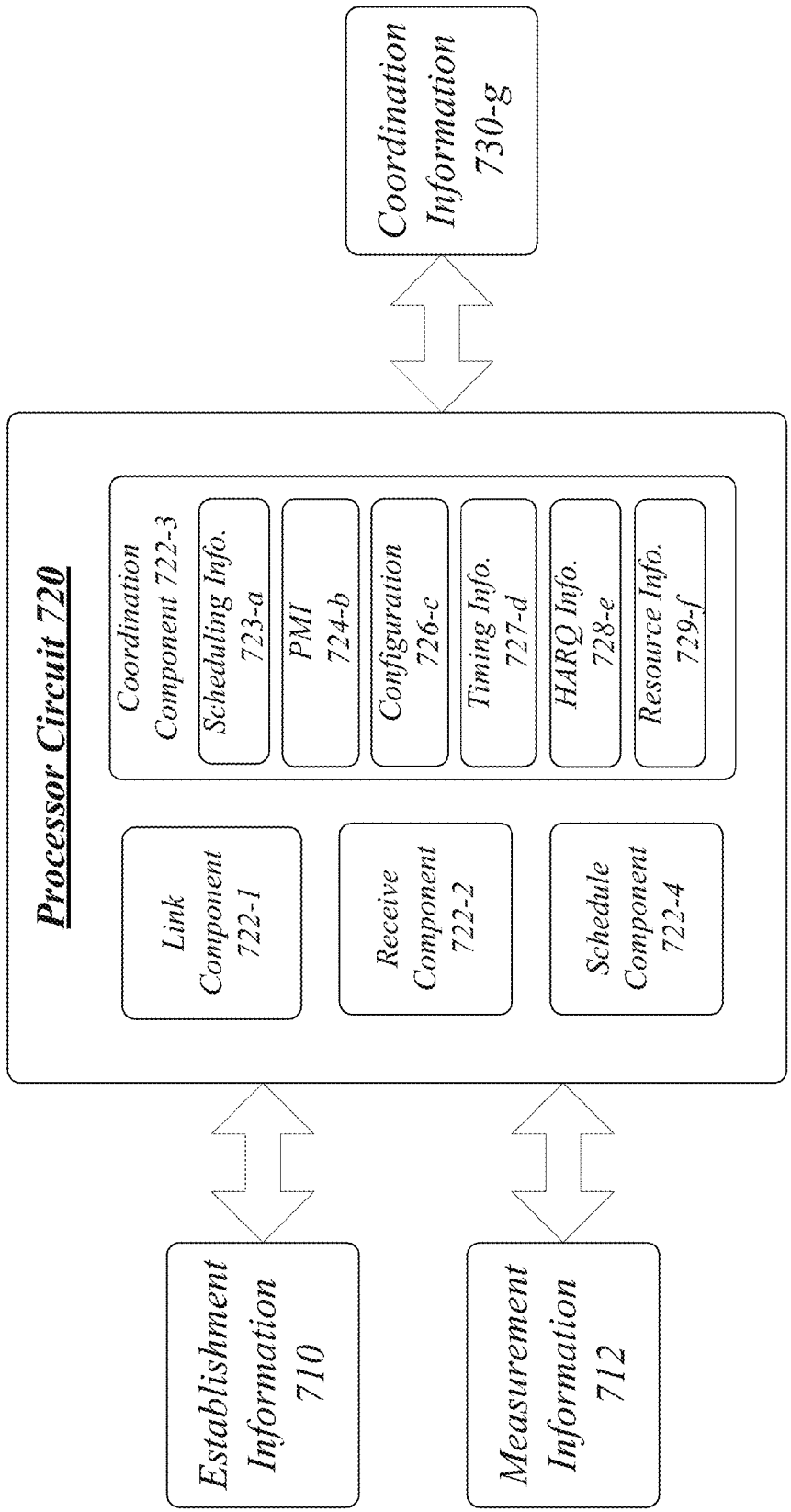
FIG. 7 illustrates an example block diagram for an apparatus.

FIG. 7 illustrates a block diagram for an apparatus 700. Although the apparatus 700 shown in FIG. 7 has a limited number of elements in a certain topology, it may be appreciated that the apparatus 700 may include more or less elements in alternate topologies as desired for a given implementation.

The apparatus 700 may comprise a computer-implemented apparatus 700 having a processor circuit 720 arranged to execute one or more software components 722-$a$. It is worthy to note that "a" and "b" and "c" and similar designators as used herein are intended to be variables representing any positive integer. Thus, for example, if an implementation sets a value for a=5, then a complete set of software components 722-$a$ may include components 722-1, 722-2, 722-3, 722-4 and 722-5. The embodiments are not limited in this context.

According to some examples, apparatus 700 may be system equipment (e.g., located at or with BS 111, 121, 131, 141, 210 or 220), such as network equipment for a communications system or network compliant with one or more 3GPP LTE Specifications. For example, apparatus 700 may be implemented as part of a base station or eNB for an LTE and/or LTE-A compliant wireless network. Although some examples are described with reference to a base station or eNB, examples may utilize any network equipment for a communications system or network. The examples are not limited in this context.

In some examples, as shown in FIG. 7, apparatus 700 includes processor circuit 720. Processor circuit 720 may be generally arranged to execute one or more software components 722-$a$. The processing circuit 720 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Core i3, Core i5, Core i7, Itanium®, Pentium®, Xeon®, and XScale® processors; and similar processors. Dual microprocessors, multi-core processors, and other multi-processor architectures may also be employed as processing circuit 720.

According to some examples, apparatus 700 may include a link component 722-1. Link component 722-1 may be arranged for execution by processor circuit 720 to establish a communication link with a wireless device such as UE 105 or UE 205. For these examples, establishment information 710 may be exchanged between the wireless device to establish the communication link. For example, apparatus 700 may operate in compliance with the 3GPP LTE-A specification and establishment information 710 may include information to establish a 3GPP LTE-A compliant communication link with the wireless device.

In some examples, apparatus 700 may also include a receive component 722-2. Receive component 722-2 may be arranged for execution by processor circuit 720 to associate the wireless device with a coordinating set of base stations for a wireless network (e.g., wireless network 100 or 200). For these examples, measurement information 712 may be received from the wireless device that indicates the wireless device's ability to receive data from the coordinating set of base stations. The coordinating set of base stations may include a base station via which apparatus 700 may be located as well as at least one other base station for the wireless network.

In some examples, apparatus 700 may also include a coordination component 722-3. Coordination component 722-3 may be arranged for execution by processor circuit 720 to coordinate transmission of one or more PDUs to the wireless device from the coordinating set of base stations. For these examples, coordinating may include exchanging information via a backhaul communication channel such Comm. Chs. 125, 135 or 145 shown in FIG. 1 or X2 Comm. Ch. 235 shown in FIG. 2. Also, for these examples, the exchanged information may be at least temporarily maintained by coordination component 722-3 (e.g., stored in a data structure such as a lookup table (LUT)). The exchanged information may include schedule information 723-$a$, PMI 724-*b*, configuration 726-*c*, timing information 727-*d*, HARQ information 728-*e* or resource information 729-*f*.

According to some examples, coordination component 722-3 may be arranged to forward a message (e.g., in the format of downlink transmission message 500) via the backhaul communication channel to one or more base stations included in the coordinating set of base stations. For these examples, the message is depicted in FIG. 7 as coordination information 730-*g*. Coordination information 730-*g* may include information to enable base stations included in the coordinating set to balance transmission load of the one or more PDUs and/or mitigate downlink transmission interference between the base stations included in the coordinating set of base stations. Coordination information 730-*g* may also include resource information exchanged with base stations included in the coordinating set of base stations to further assist with load balancing.

According to some examples, apparatus 700 may also include a schedule component 722-4. Schedule component 722-3 may be arranged for execution by processor circuit 720 to cause the one or more PDUs to be transmitted to the wireless device from the coordinating set of base stations via a plurality of separate communication links based on the exchanged information. As mentioned above, the exchanged information may include schedule information 723-*a*, PMI 724-*b*, configuration 726-*c*, timing information 727-*d*, HARQ information 728-*e* or resource information 729-*f*.

Various components of apparatus 700 and a device implementing apparatus 700 may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Example connections include parallel interfaces, serial interfaces, and bus interfaces.

Included herein is a set of logic flows representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

Figure 8:
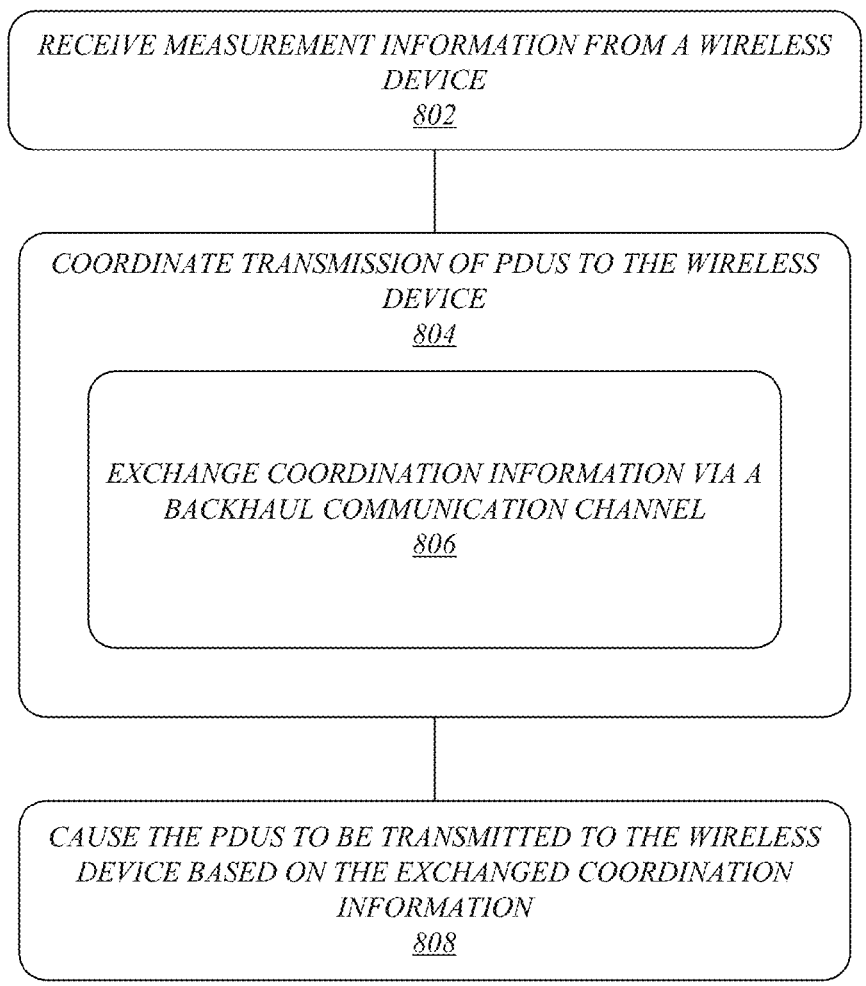
FIG. 8 illustrates an example of a first logic flow.

FIG. 8 illustrates an example of a logic flow 800. Logic flow 800 may be representative of some or all of the operations executed by one or more logic, features, or devices described herein, such as apparatus 800. More particularly, logic flow 800 may be implemented by link component 722-1, receive component 722-2, coordination component 722-3 or schedule component 722-4.

In the illustrated example shown in FIG. 8, logic flow 800 may receive measurement information from a wireless device at block 802. In some examples, receive component 722-2 of apparatus 700 (e.g., included in BS 210) may exchange measurement information with the wireless device (e.g., UE 205) that indicates an ability of the wireless device to receive data from a coordinating set of base stations via a plurality of communication links. For these examples, receive component 722-2 may receive measurement information 712 from UE 205 via CL 213. Measurement information 712 may indicate UE 205's ability to receive PDUs from at least one other base station besides BS 210. For example, measurement information 712 may indicate that UE 205 has an ability to receive PDUs from BS 220 via CL 223.

According to some examples logic flow 800 at block 804 may coordinate transmission of PDUs to the wireless device. For these examples, coordination component 722-3 at block 806 may utilize schedule information 723-*a*, PMI 724-*b*, configuration 726-*c*, timing information 727-*d* and HARQ information 728-*e* to coordinate the transmission by exchanging coordination information 730-*f* (e.g., in the format of downlink transmission message 500) via a backhaul communication channel such as X2 Comm. Ch. 235.

According to some examples, logic flow 800 at block 808 may cause the PDUs to be transmitted to the wireless device based on the exchanged coordination information. For these examples, BS 210 and BS 220 may transmit the one or more PDUs to UE 205 based on implementing a DPS CoMP scheme to load balance and/or mitigate interference associated with the transmission of the one or more PDUs.

Figure 9:
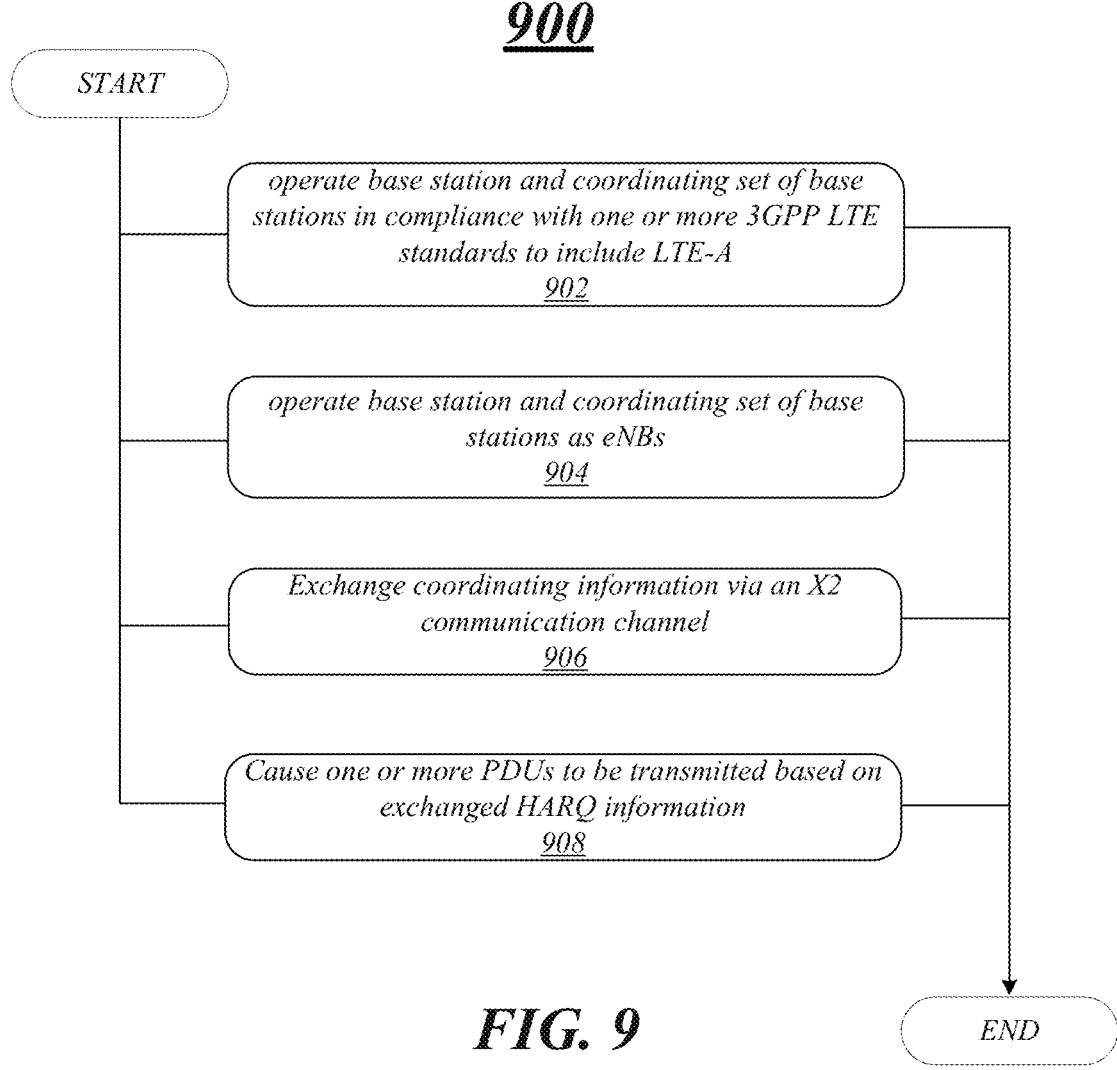
FIG. 9 illustrates an example of a second logic flow.

FIG. 9 illustrates an example of a logic flow 900. Logic flow 900 may be representative of some or all of the operations executed by one or more logic, features, or devices described herein, such as apparatus 700. More particularly, logic flow 900 may be implemented by link component 722-1, receive component 722-2, coordination component 722-3 or schedule component 722-4.

In the illustrated example shown in FIG. 9, logic flow 900 may operate a base station and coordinating set of base stations in compliance with one or more 3GPP LTE standards or specifications to include specifications associated with LTE-A at block 902. For example, the base stations depicted in FIG. 2 such as BS 210 or BS 220 may be arranged to operate in compliance with one or more specifications associated with LTE-A.

According to some examples, logic flow 900 may operate the base station and the coordinating set of base stations as eNBs at block 904. For example, BS 210 may be arranged to operate as an eNB for wireless network 200. As mentioned above, BS 210 and BS 220 may be included in a coordinating set of base stations, thus BS 220 may also be arranged to operate as an eNB for wireless network 200.

In some examples, logic flow 900 may exchange coordinating information via an X2 communication channel at block 906. For example, components of an apparatus 700 at BS 210 such as coordination component 722-3 may be arranged to exchange coordinating information with BS 220 via X2 Comm. Ch. 235. The coordination information may be in a message having at least the contents described in FIG. 5 for downlink transmission message 500. The coordination information may also be transferred to or exchanged with BS 220 via X2 messages such as a COMP SCHEDULING INFO message or a COMP DATA TRANSFER message.

According to some examples, logic flow 900 may also cause one or more PDUs to be transmitted based on exchanged HARQ information at block 908. For these examples, UE 205 may have unsuccessfully received previously transmitted PDUs from BS 220. Components of apparatus 700 at BS 210 such as coordination component 722-3 may be arranged to provide HARQ information to possibly allow BS 220 to retransmit the unsuccessfully received PDUs to UE 205.

FIG. 10 illustrates an embodiment of a storage medium 1000. The storage medium 1000 may comprise an article of manufacture. In some examples, storage medium 1000 may include any non-transitory computer readable medium or machine readable medium, such as an optical, magnetic or semiconductor storage. Storage medium 1000 may store various types of computer executable instructions, such as instructions to implement one or more of the logic flows 800 and/or 900. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 11:
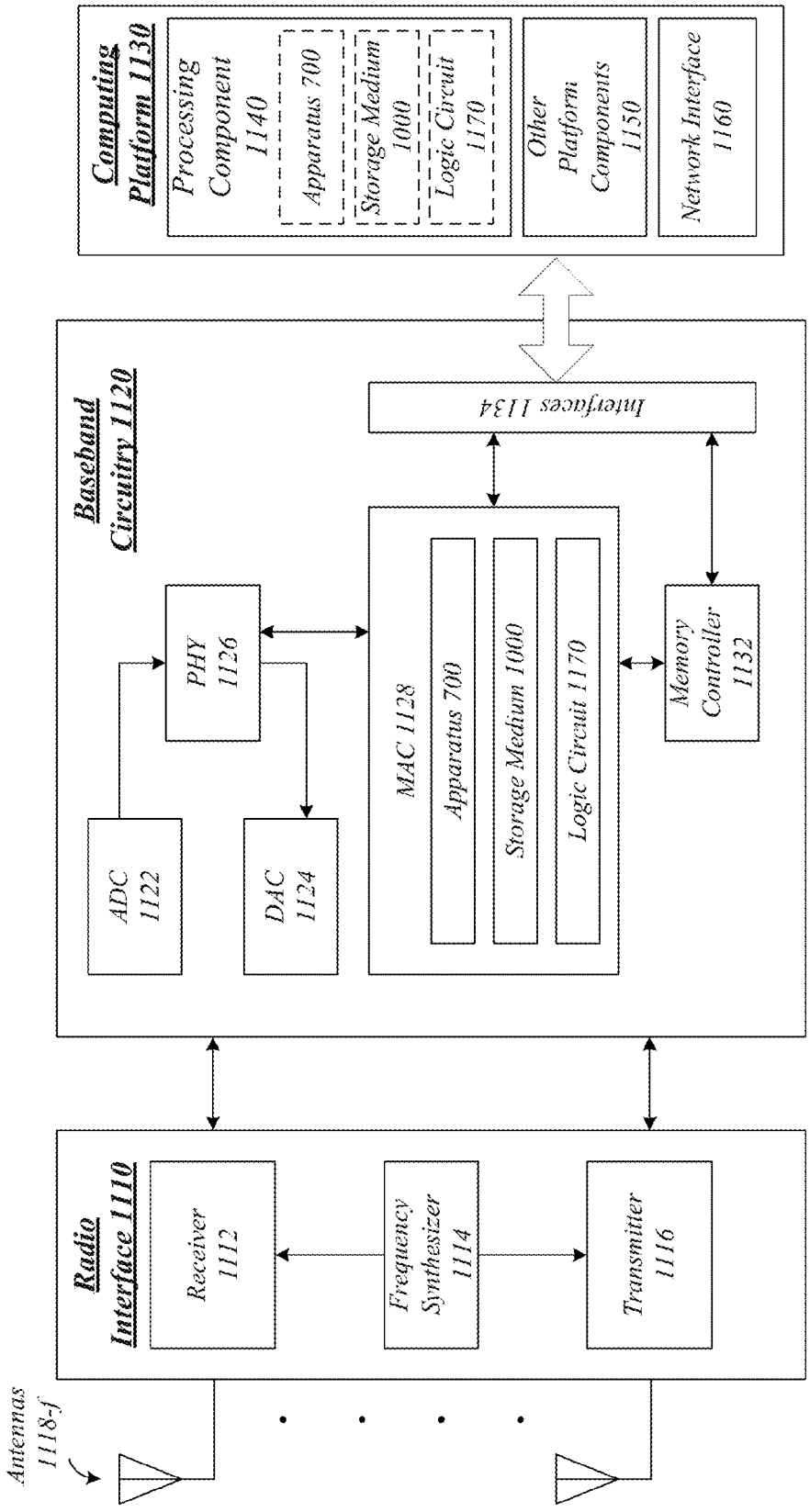
FIG. 11 illustrates an example of a communications architecture.

FIG. 11 illustrates an embodiment of a device 1100 for use in a broadband wireless access network. Device 1100 may implement, for example, apparatus 700, storage medium 1000 and/or a logic circuit 1170. The logic circuit 1170 may include physical circuits to perform operations described for apparatus 700. As shown in FIG. 11, device 1100 may include a radio interface 1110, baseband circuitry 1120, and computing platform 1130, although examples are not limited to this configuration.

The device 1100 may implement some or all of the structure and/or operations for the apparatus 700, storage medium 1000 and/or logic circuit 1170 in a single computing entity, such as entirely within a single device. Alternatively, the device 1100 may distribute portions of the structure and/or operations for the apparatus 700, storage medium 1000 and/or logic circuit 1170 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 1110 may include a component or combination of components adapted for transmitting and/or receiving single carrier or multi-carrier modulated signals (e.g., including complementary code keying (CCK) and/or orthogonal frequency division multiplexing (OFDM) symbols) although the embodiments are not limited to any specific over-the-air interface or modulation scheme. Radio interface 1110 may include, for example, a receiver 1112, a transmitter 1116 and/or a frequency synthesizer 1114. Radio interface 1110 may include bias controls, a crystal oscillator and/or one or more antennas 1118-*f*. In another embodiment, radio interface 1110 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 1120 may communicate with radio interface 1110 to process receive and/or transmit signals and may include, for example, an analog-to-digital converter 1122 for down converting received signals, a digital-to-analog converter 1124 for up converting signals for transmission. Further, baseband circuitry 1120 may include a baseband or physical layer (PHY) processing circuit 1126 for PHY link layer processing of respective receive/transmit signals. Baseband circuitry 1120 may include, for example, a processing circuit 1128 for medium access control (MAC)/data link layer processing. Baseband circuitry 1120 may include a memory controller 1132 for communicating with MAC processing circuit 1128 and/or a computing platform 1130, for example, via one or more interfaces 1134.

In some embodiments, PHY processing circuit 1126 may include a frame construction and/or detection module, in combination with additional circuitry such as a buffer memory, to construct and/or deconstruct communication frames (e.g., containing subframes). Alternatively or in addition, MAC processing circuit 1128 may share processing for certain of these functions or perform these processes independent of PHY processing circuit 1126. In some embodiments, MAC and PHY processing may be integrated into a single circuit.

Computing platform 1130 may provide computing functionality for device 1100. As shown, computing platform 1130 may include a processing component 1140. In addition to, or alternatively of, baseband circuitry 1120 of device 1100 may execute processing operations or logic for apparatus 700, storage medium 1000, and logic circuit 1170 using the processing component 1130. Processing component 1140 (and/or PHY 1126 and/or MAC 1128) may comprise various hardware elements, software elements, or a combination of both. Examples of hardware elements may include devices, logic devices, components, processors, microprocessors, circuits, processor circuits (e.g., processor circuit 720), circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

Computing platform 1130 may further include other platform components 1150. Other platform components 1150 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Computing platform 1130 may further include a network interface 1160. In some examples, network interface 1160 may include logic and/or features to support an X2 interface as described in one or more 3GPP LTE or LTE-A specifications or standards. For these examples, network interface 1160 may enable an apparatus 700 located at a base station to communicatively couple to one or more other base stations via an X2 communication channel.

Device 1100 may be, for example, user equipment, a computer, a personal computer (PC), a desktop computer, a laptop computer, a notebook computer, a netbook computer, a server, a server array or server farm, a web server, a network server, an Internet server, a work station, a minicomputer, a main frame computer, a supercomputer, a network appliance, a web appliance, a distributed computing system, multiprocessor systems, processor-based systems, wireless access point, base station, node B, subscriber station, mobile subscriber center, radio network controller, router, hub, gateway, bridge, switch, machine, or combination thereof. Accordingly, functions and/or specific configurations of device 1100 described herein, may be included or omitted in various embodiments of device 1100, as suitably desired. In some embodiments, device 1100 may be configured to be compatible with protocols and frequencies associated one or more of the 3GPP LTE Specifications and/or IEEE 802.16 Standards for WMANs, and/or other broadband wireless networks, cited herein, although the examples are not limited in this respect.

Embodiments of device 1100 may be implemented using single input single output (SISO) architectures. However, certain implementations may include multiple antennas (e.g., antennas 1118-*f*) for transmission and/or reception using adaptive antenna techniques for beamforming or spatial division multiple access (SDMA) and/or using multiple input multiple output (MIMO) communication techniques.

The components and features of device 1100 may be implemented using any combination of discrete circuitry, application specific integrated circuits (ASICs), logic gates and/or single chip architectures. Further, the features of device 1100 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 1100 shown in the block diagram of FIG. 11 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

Figure 12:
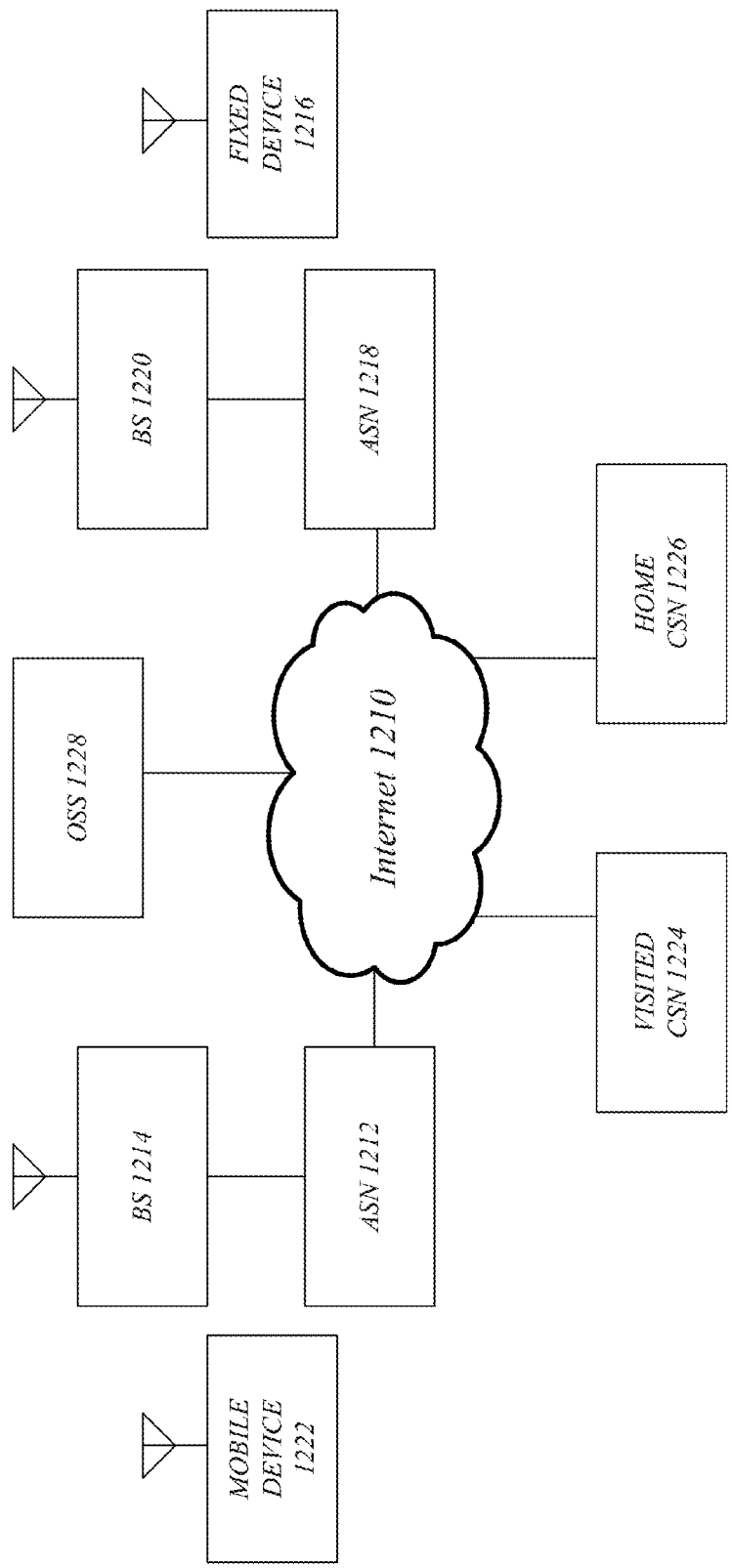
FIG. 12 illustrates an example of a communications system.

FIG. 12 illustrates an embodiment of a broadband wireless access system 1200. As shown in FIG. 12, broadband wireless access system 1200 may be an internet protocol (IP) type network comprising an internet 1210 type network or the like that is capable of supporting mobile wireless access and/or fixed wireless access to internet 1210. In one or more embodiments, broadband wireless access system 1200 may comprise any type of orthogonal frequency division multiple access (OFDMA) based wireless network, such as a system compliant with one or more of the 3GPP LTE Specifications and/or IEEE 802.16 Standards, and the scope of the claimed subject matter is not limited in these respects.

In the exemplary broadband wireless access system 1200, access service networks (ASN) 1214, 1218 are capable of coupling with base stations (BS) 1214, 1220 (or eNBs), respectively, to provide wireless communication between one or more fixed devices 1216 and internet 1210, or one or more mobile devices 1222 and Internet 1210. One example of a fixed device 1216 and a mobile device 1222 is UE 105 or UE 205, with the fixed device 1216 comprising a stationary version of UE 105 or UE 205 and the mobile device 1222 comprising a mobile version of UE 105 or UE 205. ASN 1212 may implement profiles that are capable of defining the mapping of network functions to one or more physical entities on broadband wireless access system 1200. Base stations 1214, 1220 (or eNBs) may comprise radio equipment to provide RF communication with fixed device 1216 and mobile device 1222, such as described with reference to device 1200, and may comprise, for example, the PHY, MAC, RLC or PDCP layer equipment in compliance with a 3GPP LTE Specification or an IEEE 802.16 Standard. Base stations 1214, 1220 (or eNBs) may further comprise an IP backplane to couple to Internet 1210 via ASN 1212, 1218, respectively, although the scope of the claimed subject matter is not limited in these respects.

Broadband wireless access system 1200 may further comprise a visited connectivity service network (CSN) 1224 capable of providing one or more network functions including but not limited to proxy and/or relay type functions, for example authentication, authorization and accounting (AAA) functions, dynamic host configuration protocol (DHCP) functions, or domain name service controls or the like, domain gateways such as public switched telephone network (PSTN) gateways or voice over internet protocol (VoIP) gateways, and/or internet protocol (IP) type server functions, or the like. However, these are merely example of the types of functions that are capable of being provided by visited CSN 1224 or home CSN 1226, and the scope of the claimed subject matter is not limited in these respects. Visited CSN 1224 may be referred to as a visited CSN in the case where visited CSN 1224 is not part of the regular service provider of fixed device 1216 or mobile device 1222, for example where fixed 1216 or mobile device 1222 is roaming away from their respective home CSN 1226, or where broadband wireless access system 1200 is part of the regular service provider of fixed device 1216 or mobile device 1222 but where broadband wireless access system 1200 may be in another location or state that is not the main or home location of fixed device 1216 or mobile device 1222.

Fixed device 1216 may be located anywhere within range of one or both base stations 1214, 1220, such as in or near a home or business to provide home or business customer broadband access to Internet 1210 via base stations 1214, 1220 and ASN 1212, 1218, respectively, and home CSN 1226. It is worthy to note that although fixed device 1216 is generally disposed in a stationary location, it may be moved to different locations as needed. Mobile device 1222 may be utilized at one or more locations if mobile device 1222 is within range of one or both base stations 1214, 1220, for example.

In accordance with one or more embodiments, operation support system (OSS) 1228 may be part of broadband wireless access system 1200 to provide management functions for broadband wireless access system 1200 and to provide interfaces between functional entities of broadband wireless access system 1200. Broadband wireless access system 1200 of FIG. 12 is merely one type of wireless network showing a certain number of the components of broadband wireless access system 1200, and the scope of the claimed subject matter is not limited in these respects.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled", "connected", or "capable of being coupled" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first, " "second," "third," and so forth, are used merely as labels, and are not intended to impose numerical requirements on their objects.

In some examples, first computer-implemented methods may include receiving, at a base station for a wireless network, measurement information from a wireless device that indicates an ability of the wireless device to receive data from a coordinating set of base stations via a plurality of separate communication links. The first computer-implemented methods may also include coordinating transmission of one or more protocol data units to the wireless device from the coordinating set of base stations. The coordinating may include exchanging information via one or more backhaul communication channels coupling base stations included in the coordinating set of base stations. The one or more protocol data units may be caused to be transmitted to the wireless device from the coordinating set of base stations via the plurality of separate communication links based, at least in part, on the exchanged information. According to some examples, the coordinating set may include the base station and one or more other base stations.

In some examples, the first computer-implemented methods may also include coordinating transmission of the one or more protocol data units to balance transmission load of the one or more protocol data units between the base stations included in the coordinating set of base stations and/or mitigate downlink transmission interference between the base stations included in the coordinating set of base stations of the wireless network.

According to some examples, the first computer-implemented methods may also include coordinating transmission of the one or more protocol data units to mitigate downlink transmission interference between the base stations included in the coordinating set of base stations. For these examples, mitigating downlink transmission interference may include resource blanking that may include transmission of one or more almost blank subframes, transmission of one or more reduced power subframes, or scheduling a set of blanked physical resource blocks.

In some examples, the first computer-implemented methods may also include the measurement information may include channel state information for each communication link from among the plurality of separate communication links. The channel state information for each communication link may include at least one of a precoding matrix indicator, a rank indicator or a channel quality indicator.

According to some examples for the first computer-implemented methods, the information exchanged via the backhaul communication channel may include one of scheduling information to transmit the one or more protocol data units, one or more precoding matrix indicators associated with a communication link via which the one or more protocol data units are transmitted, a subframe index associated with the one or more protocol data units, a time of a beginning of transmission of the one or more protocol data units, or HARQ information associated with the one or more protocol data units.

In some examples, the first computer-implemented methods may also include causing the one or more protocol data units to be transmitted based on one of the exchanged scheduling information or the exchanged HARQ information.

According to some examples, the first computer-implemented methods may also include exchanging resource information periodically with the coordinating set of base stations and updating the scheduling information based, at least in part, on the exchanged resource information.

According to some examples, the first computer-implemented methods may also include operating the base station and the coordinating set of base stations in compliance with one or more or more 3GPP LTE standards to include LTE-A. For these examples, base station and the coordinating base stations may be operated as an eNB and the one or more backhaul communication channels coupling the eNBs included in the coordinating set of eNBs may be an X2 communication channel. Also for these examples, the information exchanged via the X2 communication channel may include scheduling information formatted in a downlink control information (DCI) message format.

According to some examples, at least one machine readable medium comprising a plurality of instructions that in response to being executed on a computing device cause the computing device to carry out the example first computer-implemented methods as mentioned above.

In some examples a communications device may be arranged to perform the example first computer-implemented methods as mentioned above.

In some examples an apparatus or device may include means for performing the example first computer-implemented methods as mentioned above.

According to some examples, an example first apparatus for a base station may include a processor circuit and a receive component arranged for execution by the processor circuit to receive measurement information from a wireless device that indicates an ability of the wireless device to receive data from a coordinating set of base stations via a plurality of separate communication links. The first apparatus may also include a coordination component arranged for execution by the processor circuit to coordinate transmission of one or more protocol data units to the wireless device from the coordinating set of base stations. The coordination may include exchanging information via a backhaul communication channel configured to couple base stations included in the coordinating set of base stations. The exchanged information to include scheduling information to transmit the one or more protocol data units or one or more precoding matrix indicators associated with the plurality of separate communication links. The first apparatus may also include a schedule component arranged for execution by the processor circuit to cause the one or more protocol data units to be transmitted to the wireless device from the coordinating set of base stations via the plurality of separate communication links based, at least in part, on the exchanged information.

In some examples for the example first apparatus, the coordinating set may include the base station and one or more other base stations of the wireless network.

In some examples for the example first apparatus, the coordination of the transmission of the one or more protocol data units to the wireless device may be to balance transmission load of the one or more protocol data units between the base stations included in the coordinating set of base stations and/or mitigate downlink transmission interference between the base stations included in the coordinating set of base stations.

According to some examples, the example first apparatus may also mitigate downlink transmission interference via resource blanking that includes at least one of transmission of one or more almost blank subframes, transmission of one or more reduced power subframes, or scheduling a set of blanked physical resource blocks.

In some examples, the example first apparatus may also include a radio interface coupled to the processor circuit to receive the measurement information from the wireless device. According to some examples, the measurement information may include channel state information for each communication link from among the plurality of separate communication links. The channel state information for each communication link may include at least one of a precoding matrix indicator, a rank indicator or a channel quality indicator.

In some examples for the example first apparatus, the information exchanged via the backhaul communication channel also including at least one of a subframe index associated with the one or more protocol data units, a time of a beginning of transmission of the one or more protocol data units, or hybrid automatic repeat request (HARQ) information associated with the one or more protocol data units.

According to some examples for the example first apparatus, the schedule component may also be arranged to cause the one or more protocol data units to be transmitted based on one of the exchanged scheduling information or the exchanged HARQ information.

In some examples for the example first apparatus, the coordination component may also be arranged to exchange resource information periodically with the coordinating set of base stations and the schedule component may also be arranged to update the scheduling information based, at least in part, on the exchanged resource information.

According to some examples for the example first apparatus, the base station and the coordinating set of base stations may be arranged to operate as eNBs in compliance with one or more or more 3GPP LTE standards to include LTE-A. For these examples, an X2 interface may be coupled to the processor circuit to enable the coordination component to coordinate transmission of one or more protocol data units to the wireless device from the coordinating set of base stations.

In some examples for the example first apparatus, a digital display may be coupled to the processor circuit to present a user interface view.

According to some examples, an example second apparatus for a base station may include means for receiving channel state information from a wireless device. The channel state information to indicate an ability of the wireless device ability to receive data from a coordinating set of base stations via a plurality of separate communication links. The example second apparatus may also include means for coordinating transmission of one or more protocol data units to the wireless device from the coordinating set of base stations. The coordinating may include exchanging information via a backhaul communication channel configured to couple the base stations included in the coordinating set of base stations. The second apparatus may also include means for initiating the transmission of the one or more protocol data units to the wireless device from the coordinating set of base stations via a plurality of separate communication links based, at least in part, on the exchanged information.

In some examples for the example second apparatus, the coordinating of the transmission of the one or more protocol data units to the wireless device may be to balance transmission load of the one or more protocol data units between the base stations included in the coordinating set of base stations and/or mitigate downlink transmission interference between the base stations included in the coordinating set of base stations.

According to some examples, the second example apparatus may also include means for communicating with the wireless device to receive the measurement information.

In some examples for the example second apparatus, the measurement information may include channel state information to include at least one of a precoding matrix indicator, a rank indicator or a channel quality indicator.

According to some examples for the example second apparatus, the information exchanged via the backhaul communication channel may include one of scheduling information to transmit the one or more protocol data units, one or more precoding matrix indicators associated with a communication link via which the one or more protocol data units are transmitted, a subframe index associated with the one or more protocol data units, a time of a beginning of transmission of the one or more protocol data units, or HARQ information associated with the one or more protocol data units.

In some examples for the second example apparatus, the means for initiating the transmission of the one or more protocol data units to the wireless device may also include means for initiating the transmission of the one or more protocol data units based on one of the exchanged scheduling information or the exchanged HARQ information.

According to some examples for the second example apparatus, the means for coordinating transmission of the one or more protocol data units may also include means for exchanging resource information periodically with the coordinating set of base stations. Also, the second example apparatus may also include means for updating the scheduling information based, at least in part, on the exchanged resource information.

In some examples, the example second apparatus may also include means for operating the base station and the coordinating set of base stations as eNBs in compliance with one or more or 3GPP LTE standards to include LTE-A. This example second apparatus may also include means for communicating to base stations included in the coordinating set of base stations via an X2 interface in order to coordinate transmission of the one or more data units to the wireless device from the coordinating set of base stations.

In some examples, second computer-implemented methods may include transmitting, from a first base station, scheduling information via a backhaul communication channel to a second base station. The scheduling information may be for transmitting one or more protocol data units to a wireless device having an ability to receive data from the first base station. The second computer-implemented methods may also include coordinating with the second base station via the backhaul communication channel transmission of the one or more protocol data units to the wireless device based on the scheduling information or based on hybrid automatic repeat request (HARQ) information associated with the transmission of the one or more protocol data units to the wireless device.

In some examples, the second computer-implemented methods may also include coordinating transmission of the one or more protocol data units to balance transmission load of the one or more protocol data units between the first and the second base stations. Coordinating transmission of the one or more protocol data units may also be for mitigating downlink transmission interference between the first and the second base stations.

According to some examples, the second computer-implemented methods may also include coordinating transmission of the one or more protocol data units to mitigate downlink transmission interference between the first and the second base stations via resource blanking that includes at least one of transmission of one or more almost blank subframes, transmission of one or more reduced power subframes, or scheduling a set of blanked physical resource blocks.

In some examples, the second computer-implemented methods may also include transmitting, from the first base station, via the backhaul communication channel to the second base station at least one of a precoding matrix indicator associated with a communication link via which the one or more protocol data units are to be transmitted to the wireless device, a subframe index associated with the one or more protocol data units or a time of a beginning of transmission of the one or more protocol data units to the wireless device.

According to some examples, the second computer-implemented methods may also include the first and second base stations being operated as Evolved Node Bs (eNBs) in compliance with one or more 3rd Generation Partnership Project (3GPP) Long Term Evolution (LTE) standards to include LTE-Advanced (LTE-A). For these examples, the backhaul communication channel may be an X2 communication channel.

According to some examples, at least one machine readable medium comprising a plurality of instructions that in response to being executed on a computing device cause the computing device to carry out the example second computer-implemented methods as mentioned above.

In some examples a communications device may be arranged to perform the example second computer-implemented methods as mentioned above.

In some examples an apparatus or device may include means for performing the example second computer-implemented methods as mentioned above.

In some examples, third computer-implemented methods may include receiving, at a first base station, schedule information via a backhaul communication channel from a second base station. The schedule information may be associated with transmitting one or more protocol data units to a wireless device having an ability to receive data from both the first base station and the second base station. The third computer-implemented methods may also include coordinating with the second base station via the backhaul communication channel transmission of the one or more protocol data units to the wireless device based on the scheduling information. Also, resource information may be received from the second base station via the backhaul communication channel. The resource information may indicate additional or less resources available to the second base station for transmitting the one or more protocol data units to the wireless device. Transmission of the one or more protocol data units to the wireless device may then be adjusted based on the resource information.

According to some examples, the third computer-implemented methods may also include coordinating transmission of the one or more protocol data units to balance transmission load of the one or more protocol data units between the first and the second base stations or mitigate downlink transmission interference between the first and the second base stations.

In some examples, the third computer-implemented methods may also include coordinating transmission of the one or more protocol data units to mitigate downlink transmission interference between the first and the second base stations via resource blanking. Resource blanking may include at least one of transmission of one or more almost blank subframes, transmission of one or more reduced power subframes, or scheduling a set of blanked physical resource blocks.

According to some examples, the third computer-implemented methods may also include transmitting, from the first base station, via the backhaul communication channel to the second base station at least one of a precoding matrix indicator associated with a communication link via which the one or more protocol data units are to be transmitted to the wireless device, a subframe index associated with the one or more protocol data units, a time of a beginning of transmission of the one or more protocol data units to the wireless device or hybrid automatic repeat request (HARQ) information associated with transmission of the one or more protocol data units.

In some examples, the third computer-implemented methods may also include the first and second base stations being operated as Evolved Node Bs (eNBs) in compliance with one or more 3rd Generation Partnership Project (3GPP) Long Term Evolution (LTE) standards to include LTE-Advanced (LTE-A). For these examples, the backhaul communication channel may be an X2 communication channel.

According to some examples, at least one machine readable medium comprising a plurality of instructions that in response to being executed on a computing device cause the computing device to carry out the example third computer-implemented methods as mentioned above.

In some examples a communications device may be arranged to perform the example third computer-implemented methods as mentioned above.

According to some examples an apparatus or device may include means for performing the example third computer-implemented methods as mentioned above.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An evolved node B (eNB), comprising:
   logic, at least a portion of which is in hardware, the logic to receive measurement information indicating an ability of a user equipment (UE) to receive protocol data units (PDUs) via coordinated transmissions of multiple eNBs and send an X2 message over an X2 communication channel to coordinate transmission of a plurality of PDUs comprising data for the UE according to a coordinated multipoint (CoMP) scheme, the X2 message to comprise CoMP scheduling information to indicate a schedule for transmission of a first set of one or more of the plurality of PDUs according to the CoMP scheme, the logic to receive hybrid automatic repeat request (HARQ) information for the plurality of PDUs and send HARQ coordination information over the X2 communication channel based on the received HARQ information; and
   a transmitter to transmit a second set of one or more of the plurality of PDUs according to the CoMP scheme.

2. The eNB of claim 1, the HARQ coordination information to indicate a respective acknowledgment (ACK) or negative acknowledgement (NACK) for each of the first set of PDUs.

3. The eNB of claim 1, the HARQ coordination information to identify one or more PDUs to be retransmitted from among the first set of PDUs.

4. The eNB of claim 1, the HARQ coordination information to comprise a HARQ process identification (ID).

5. The eNB of claim 1, the logic to retransmit one or more of the first set of PDUs in response to receipt of the HARQ information.

6. The eNB of claim 1, the X2 message to comprise one or more General Packet Radio Service (GPRS) tunneling protocol user-plane (GTP-u) sequence numbers.

7. The eNB of claim 1, the X2 message to comprise a precoding matrix indicator (PMI) for use in conjunction with transmission of the first set of PDUs.

8. The eNB of claim 1, comprising at least one processor circuit and at least one memory.

9. An evolved node B (eNB), comprising:
   at least one radio frequency (RF) transceiver; and
   logic, at least a portion of which is in hardware, the logic to receive a first X2 message via an X2 interface, the first X2 message to indicate a schedule for transmission of a set of one or more protocol data units (PDUs) according to a coordinated multipoint (CoMP) scheme, the logic to cause transmission of the set of PDUs according to the indicated schedule and receive a second X2 message via the X2 interface, the second X2 message to comprise hybrid automatic repeat request (HARQ) information for the set of PDUs, the logic to determine whether to retransmit one or more of the set of PDUs based on the HARQ information.

10. The eNB of claim 9, the first X2 message to comprise one or more General Packet Radio Service (GPRS) tunneling protocol user-plane (GTP-u) sequence numbers.

11. The eNB of claim 9, the logic to cause transmission of the set of PDUs using a precoding matrix indicator (PMI) comprised in the first X2 message.

12. The eNB of claim 9, the logic to cause transmission of at least one of the set of PDUs during a subframe identified by a subframe index comprise in the first X2 message.

13. The eNB of claim 9, the HARQ information to indicate a respective acknowledgment (ACK) or negative acknowledgement (NACK) for each of the set of PDUs.

14. The eNB of claim 13, the logic to determine to retransmit one or more of the set of PDUs in response to a determination that the HARQ information indicates a respective NACK for each of the one or more PDUs.

15. The eNB of claim 9, the HARQ information to comprise a HARQ process identification (ID).

16. The eNB of claim 9, the CoMP scheme to comprise a dynamic point selection (DPS) CoMP scheme.

17. At least one non-transitory computer-readable storage medium comprising a set of instructions that, in response to being executed at an evolved node B (eNB), cause the eNB to:
   send a first X2 interface message, the first X2 message to comprise CoMP scheduling information to indicate a schedule for transmission of a first set of one or more protocol data units (PDUs) according to a dynamic point selection (DPS) coordinated multipoint (CoMP) scheme;
   transmit a second set of one or more PDUs according to the DPS CoMP scheme;
   receive hybrid automatic repeat request (HARQ) information for the first set of PDUs and the second set of PDUs; and
   send a second X2 interface message comprising HARQ coordination information based on the HARQ information for the first set of PDUs.

18. The at least one non-transitory computer-readable storage medium of claim 17, comprising instructions that, in response to being executed at the eNB, cause the eNB to transmit the second set of PDUs over a physical downlink shared channel (PDSCH).

19. The at least one non-transitory computer-readable storage medium of claim 17, the first X2 interface message to comprise a precoding matrix indicator (PMI) for use in conjunction with transmission of the first set of PDUs.

20. The at least one non-transitory computer-readable storage medium of claim 17, the first X2 interface message to comprise one or more General Packet Radio Service (GPRS) tunneling protocol user-plane (GTP-u) sequence numbers.

21. The at least one non-transitory computer-readable storage medium of claim 17, the HARQ coordination information to indicate a respective acknowledgment (ACK) or negative acknowledgement (NACK) for each of the first set of PDUs.

22. The at least one non-transitory computer-readable storage medium of claim 17, the HARQ coordination information to identify one or more PDUs to be retransmitted from among the first set of PDUs.

23. The at least one non-transitory computer-readable storage medium of claim 17, the HARQ coordination information to comprise a HARQ process identification (ID).

24. The at least one non-transitory computer-readable storage medium of claim 17, comprising instructions that, in response to being executed at the eNB, cause the eNB to retransmit one or more of the first set of PDUs based on the HARQ information for the first set of PDUs.

* * * * *